United States Patent
Joung et al.

(10) Patent No.: US 9,490,678 B2
(45) Date of Patent: Nov. 8, 2016

(54) GENERATOR HAVING VARIABLE POWER GENERATION

(75) Inventors: Pil-Kyou Joung, Chungcheongnam-do (KR); Min-Kyu Jung, Chungcheongnam-do (KR)

(73) Assignee: PHILSUNG CO., LTD. (KR)

( * ) Notice: Subject to any disclaimer, the term of this patent is extended or adjusted under 35 U.S.C. 154(b) by 115 days.

(21) Appl. No.: 14/129,539

(22) PCT Filed: May 10, 2012

(86) PCT No.: PCT/KR2012/003640
§ 371 (c)(1),
(2), (4) Date: Dec. 26, 2013

(87) PCT Pub. No.: WO2013/002487
PCT Pub. Date: Jan. 3, 2013

(65) Prior Publication Data
US 2014/0191599 A1 Jul. 10, 2014

(30) Foreign Application Priority Data

Jun. 28, 2011 (KR) .................. 10-2011-0063099

(51) Int. Cl.
*H02K 7/10* (2006.01)
*H02K 7/108* (2006.01)
(Continued)

(52) U.S. Cl.
CPC .............. *H02K 7/1085* (2013.01); *H02K 1/27* (2013.01); *H02K 7/12* (2013.01); *H02K 16/00* (2013.01); *H02K 21/24* (2013.01); *H02K 7/1838* (2013.01)

(58) Field of Classification Search
CPC .................... H02K 7/1085; H02K 7/1838
USPC ................. 290/54, 55; 310/112, 113, 114, 78
See application file for complete search history.

(56) References Cited

U.S. PATENT DOCUMENTS

| 4,585,950 A * | 4/1986 | Lund | F03D 9/002 290/44 |
| 8,836,158 B2 * | 9/2014 | Cho | F03D 9/002 290/55 |
| 2005/0280264 A1 | 12/2005 | Nagy | |

FOREIGN PATENT DOCUMENTS

| JP | 2001-186740 A | 7/2001 |
| JP | 2003-336571 A | 11/2003 |

(Continued)

OTHER PUBLICATIONS

International Search Report mailed Oct. 25, 2012, for PCT/KR2012/003640.

(Continued)

*Primary Examiner* — Hanh Nguyen
(74) *Attorney, Agent, or Firm* — Hershkovitz & Associates, PLLC; Abe Hershkovitz (57) ABSTRACT

A generator having variable power generation in which a plurality of rotors are inserted into one rotating shaft, a central connecting shaft of one rotor is detachably provided to one end of a connecting shaft of another rotor, magnets respectively arranged on ends of the two connecting shafts adjacent to each other are arranged to allow surfaces thereof having the same polarity to oppose each other, thereby spacing the two rotors apart from each other through a repelling force between the magnets. When an external pressure greater than or equal to the repelling force between the two magnets is applied in the shaft direction, the connecting shafts of the two rotors are coupled to each other to transmit a rotational force to both of the two rotors, thereby generating power and successively increasing the power generation in accordance with the external environment.

6 Claims, 5 Drawing Sheets

(51) Int. Cl.
    *H02K 21/24* (2006.01)
    *H02K 7/12* (2006.01)
    *H02K 1/27* (2006.01)
    *H02K 16/00* (2006.01)
    *H02K 7/18* (2006.01)

(56) References Cited

FOREIGN PATENT DOCUMENTS

KR    10-2010-0085500 A    7/2010
KR    10-2011-0060771 A    6/2011

OTHER PUBLICATIONS

English Language Abstract of JP 2001-186740A.
English Language Abstract of JP 2003-336571A.
English Language Abstract of KR 10-2011-0060771A.
English Language Abstract of KR 10-2010-0085500A.

\* cited by examiner

GENERATOR HAVING VARIABLE POWER GENERATION

CROSS-REFERENCE TO RELATED APPLICATION

The present Application is a US National Phase Application of PCT/KR2012/003640 filed May 10, 2012, which in turn claims benefit under 35 U.S.C. §119(a) of Korean Patent Application No. 10-2011-0063099 filed on Jun. 28, 2011.

FIELD OF THE INVENTION

The present invention disclosed herein relates to a generator having variable power generation, and more particularly, to a generator having variable power generation in which a plurality of rotors are inserted into one rotating shaft, a central connecting shaft of one rotor is detachably provided to one end of a connecting shaft of another rotor, magnets respectively arranged on ends of the two connecting shafts adjacent to each other are arranged to allow surfaces thereof having the same polarity to oppose each other, thereby spacing the two rotors apart from each other through a repelling force between the magnets, and when an external pressure greater than or equal to the repelling force between the two magnets is applied in the shaft direction, the connecting shafts of the two rotors are coupled to each other to transmit a rotational force to both of the two rotors, thereby generating power which is the electricity and successively increasing the amount of power generation in accordance with the external environment.

BACKGROUND OF THE INVENTION

Generally, power generation (the generation of electricity) has been conducted by evaporating water by using fossil fuel energy and rotating a rotor by using the evaporated vapor. However, in recent years, due to the rapid depletion of fossil fuel energy, studies on alternative energy are actively progressing. These studies are focusing on using water power and wind power to generate power, both of which are in the limelight of the world as types of alternative energy. The use of alternative energy is important the replacement of the simply provided energy source as well as to effectively generate power from the provided energy source.

Power generation from the above-mentioned energy source is realized by generators, for example, revolving armature type generators that are widely used as a direct current generator and revolving field type generators that are widely used as an alternating current (AC) generator.

The revolving armature type generator is a generator in which a magnetic field stops and a conductor rotates, on the contrary, while the revolving field type generator is a generator in which a conductor stops and a magnetic field rotates. In addition, there is a generator, in which a field coil, a rectifier, and a three-phase power source for the rectifier all are accommodated into the rotor, as the AC generator. This generator is called a brushless AC generator. Since the brushless AC generator did not have a slip ring and a brush, abrasion or exchange of the brush has not occurred, and thus it is being mainly used for high-capacity generators due to easily repair the generator.

Also, conventional generators generates the electricity so as to have rated power generation suitable for installed locations to generate power when a rotational force occurs in a predetermined range.

However, in case of a large-scaled generator, the generator demands a rotational force having predetermined magnitude or more for generating power because a large capacity generator has a great heavy weight in a rotating shaft itself. That is, in case of the large-scaled generator, in addition to the weight of the rotating shaft itself, the rotating shaft may be put on weight by a gear box installed for increasing power generation. Thus, it is difficult to initially operate the generator, and a lot of noises occur. As a result, if a rotational force less than the magnitude of a rotational force for stating of the power generation is supplied to the generator, the conventional generator having the conventional heavy rotating shaft may not be rotated or do not generate power even though the rotating shaft rotates, then the supplied rotational force may be dissipated without being contributed to the power generation. Moreover, if a rotational force greater than the rated power generation is supplied, then the power generation of the generator may exceed its limit of the amount of power generation. Thus, the surplus rotational force may not be contributed to the power generation and may be dissipated. Thus, there is a disadvantage in that the rotational force less than that for the starting of the power generation or the surplus rotational force is not utilized.

In recent years, various methods for maximizing the power generation efficiency are being studied. For example, the permanent magnet type generators are provided in plurality to generate high power generation efficiency when the rotational force is generated. Nevertheless, the method has disadvantages that the initial behavior is difficult due to resistance in installation of a plurality of the generators and the weight of rotating shaft. Also, even if the rotating shaft rotates, there is a disadvantage that the power generation is not yet realized until a sufficient rotational force is generated. Furthermore, in the conventional generator, there is a disadvantage that the rotational force less than that for starting of the power generation is not utilized.

SUMMARY OF THE INVENTION

To solve the above-described problems in the related art, the present invention provides an optimal power amount of generation in response to various ranges of rotational force generated by using one generator without installing an additional generator.

That is, according to the present invention, a plurality of rotors are inserted into one rotating shaft, the plurality of rotors are detachably connected to each other, two rotors are spaced apart from each other by a repelling force between magnets having the same polarity which are respectively disposed on the two rotors facing each other, when an external pressure greater than or equal to the repelling force between the two magnets is applied, the rotors are engaged with one another to transmit a rotational force so as to generate power, and the amount of power generation varies in accordance with the intensity of the supplied rotational force.

BRIEF DESCRIPTION OF THE DRAWINGS

The above and other aspects, features and advantages of certain exemplary embodiments of the present invention will be more apparent from the following detailed description taken in conjunction with the accompanying drawings, in which.

DETAILED DESCRIPTION OF THE INVENTION

Hereinafter, the exemplary embodiments of the present invention will be described in detail with reference to the accompanying drawings. However, the accompanying drawings are examples for easily illustrating the content of the spirit and scope of the present invention, it is hereby not to be limited or change the scope of the present invention. While the present invention has been particularly shown and described with reference to exemplary embodiments thereof, it will be understood by those of ordinary skill in the art that various changes in form and details may be made therein without departing from the spirit and scope of the present invention as defined by the following claims.

Figure 1:
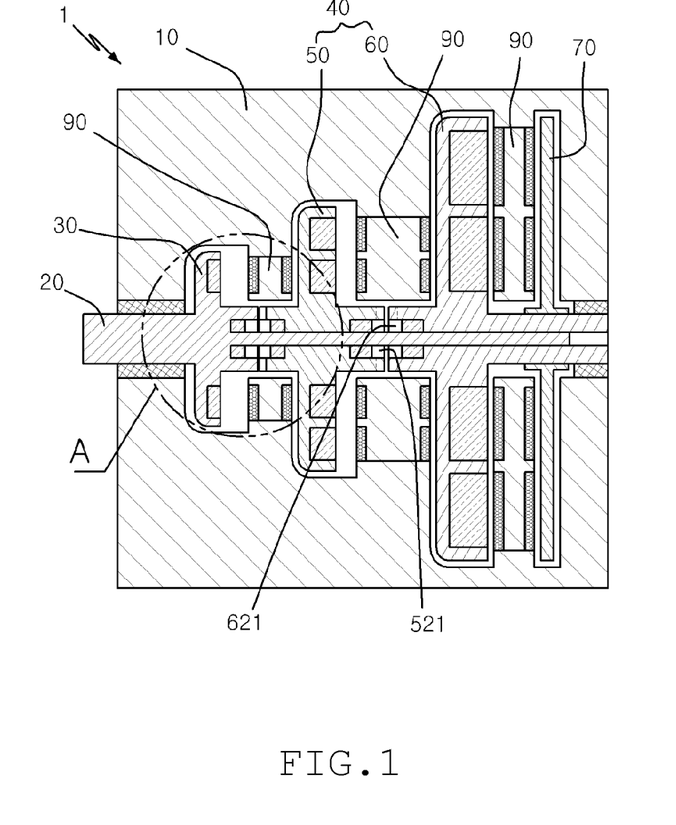
FIG. 1 is a cross-sectional view of a generator having variable power generation according to the present invention.
Figure 2:
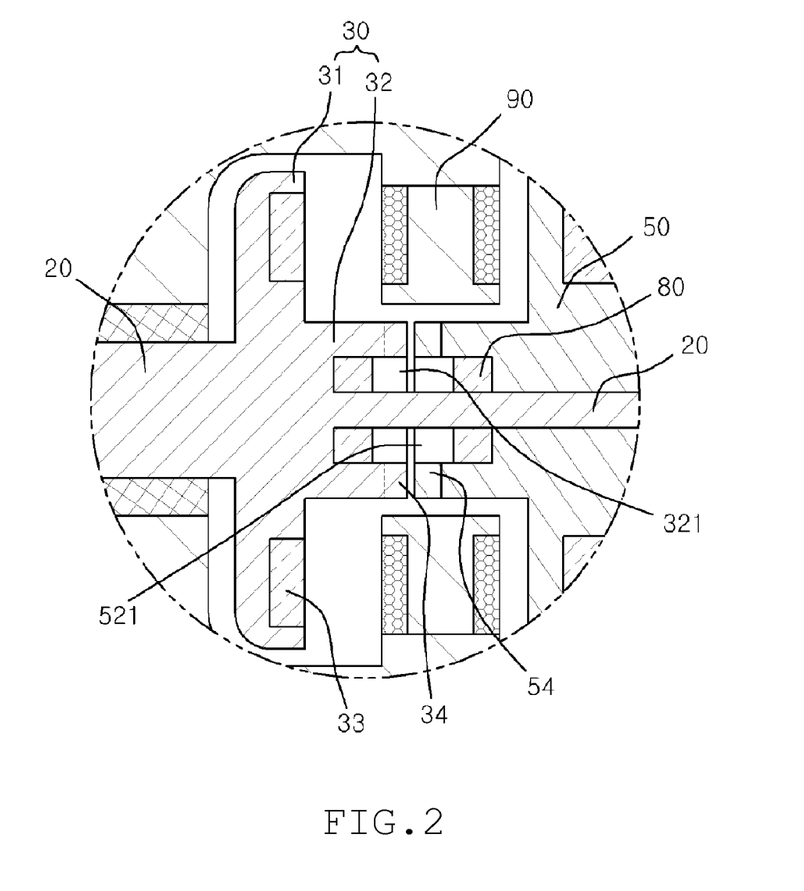
FIG. 2 is a partial enlarged view of a portion A of FIG. 1.
Figure 3:
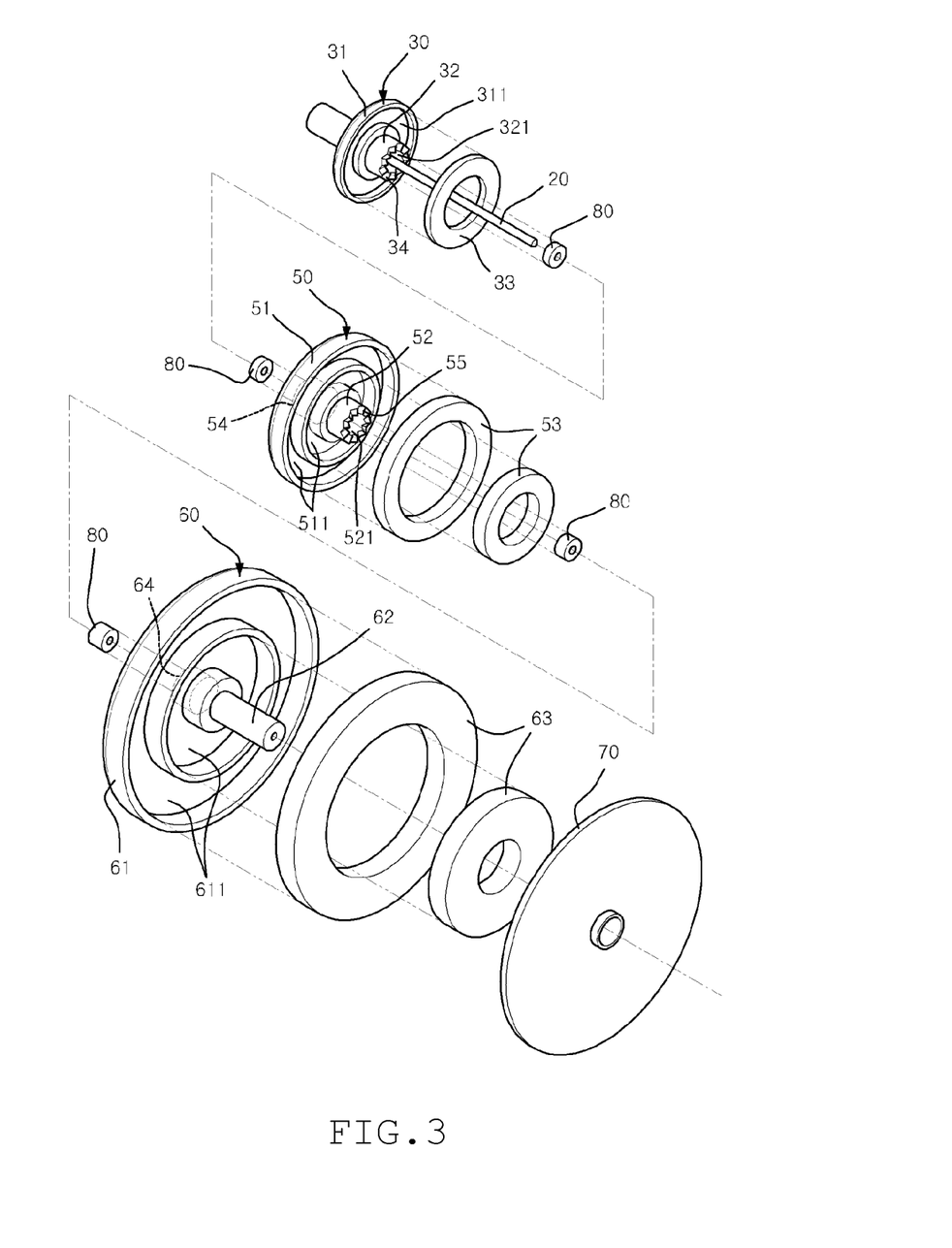
FIG. 3 is an exploded cross-sectional view of the generator having the variable power generation according to the present invention.

FIG. 1 is a cross-sectional view of a generator having variable power generation according to the present invention, FIG. 2 is a partial enlarged view of a portion A of FIG. 1, and FIG. 3 is an exploded cross-sectional view of the generator having the variable power generation according to the present invention.

Figure 4:
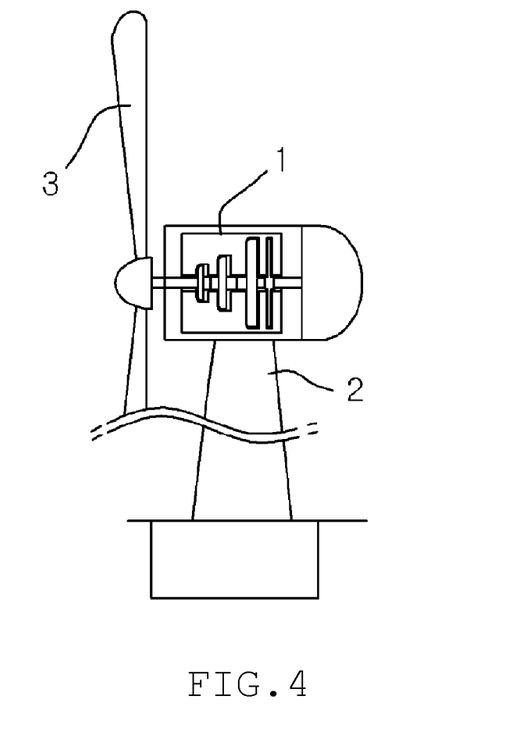
FIGS. 4 and 5 are schematic views illustrating generators installed in vertical and horizontal axis directions, respectively, according to the present invention.
Figure 5:
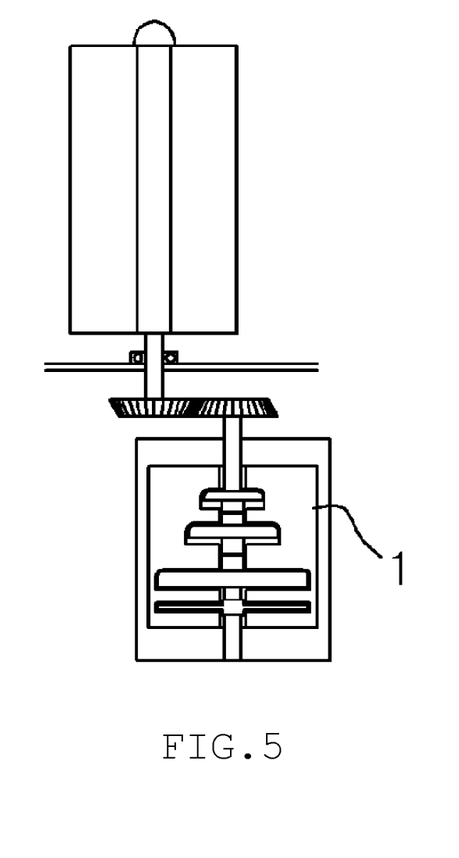

Referring to FIG. 1, a generator 1 of the present invention is provided with a generator body 10. A rotating shaft 20 is disposed inside the generator body. The rotating shaft is transmitted a rotational force from the outside to rotate. The rotating shaft may be rotatably supported by the body with at least two contact points to minimize vibration occurring when the rotating shaft rotates and to prevent a position of the rotating shaft from changing. Also, since the transmitted rotational force was transmitted to the rotating shaft 20 by directly connecting a rotation blade to an external end of the rotating shaft 20 or through a separate rotational force transmission shaft, the rotating shaft 20 may be horizontally and vertically installed as shown in FIGS. 4 and 5.

A shaft fixing rotor 30 and a movable rotor 40 may be further disposed on the rotating shaft 20.

The shaft fixing rotor 30 may be integrated with the rotating shaft 20 as shown in the drawings or may be separately provided and then be integrally coupled to the rotating shaft 20. The shaft fixing rotor 30 is provided with a rotational part 31 having a disc shape, and an annular magnet 33 is inserted into a back surface of the rotational part 31. That is, a magnet insertion groove 311 may be formed in the back surface of the rotational part, and the annular magnet may be firmly inserted into the magnet insertion groove 311 so as to rotate together with the annular magnet when the shaft fixing rotor 30 rotates.

Also, the movable rotor 40 may be provided in plurality, e.g., first and second movable rotors 50 and 60 as shown in the drawings or may be axially installed as needed. The first and second movable rotors 50 and 60 that are movable rotors may be provided with rotational parts 51 and 61 having a disc shape respectively such as the shaft fixing rotor, and magnet insertion grooves 511 and 611 may be formed in back surfaces of the rotational parts to firmly install annular magnets 53 and 63 therein, respectively.

Herein, the annular magnets 33, 53, and 63 may be one magnet having an annular shape or a magnet in which a plurality of magnet pieces are annularly connected to each other. Also, in the case of the annular magnet constituted by a plurality of magnet pieces, the annular magnet may have a shape in which polarities different from each other are alternately disposed.

Furthermore, connecting shafts 32, 52, and 62 each having a tube shape respectively are disposed on central portions of the shaft fixing rotor 30 and the first and second movable rotors 50 and 60, respectively. The rotating shaft 20 is disposed on the center of the connecting shaft or inserted to pass through the connecting shaft. The connecting shaft may extend by a predetermined length in front and rear directions, which correspond to an axial direction, than the rotational part. Also, coupling units 34, 54, 55, and 64 may be disposed on the end of the connecting shaft and detachably connected to the connecting shaft of the other rotor so as to adjust an interval between the rotors. The connecting shafts 52 and 62 of the first and second movable rotors 50 and 60 may be slidably mounted on the rotating shaft 20. The connecting shafts and the rotating shaft may be coupled to each other by using a bearing to minimize friction therebetween. Here, various coupling methods that are well-known in the art may be applicable as a method for minimizing the friction.

As shown in the drawings, the shaft fixing rotor 30 according to the embodiment of the present invention may be integrated with the rotating shaft 20, and thus the connecting shaft of the shaft fixing rotor may have a diameter greater than that of the rotating shaft and protrude from the shaft fixing rotor 30. The coupling unit 34 may be disposed on only a rear end of the connecting shaft 30.

The first movable rotor 50 may be slidably coupled to the rotating shaft in an axial direction. The connecting shaft 52 disposed on a center of the rotational part 51 may protrude by a predetermined length in forward and backward directions, and the coupling units 54 and 55 may be disposed on both ends of the connecting shaft 52, respectively.

The second movable rotor 60 may be slidably coupled to the rotating shaft in an axial direction. The connecting shaft 62 disposed on a center of the rotational part 61 may protrude by a predetermined length in forward and backward directions. The coupling unit 61 may be disposed on only a front end of the connecting shaft 62, and a rear end of the connecting shaft 62 may be supported by the body.

Also, an end rotary plate 70 having the same diameter as that of the second movable rotor may be further disposed on the connecting shaft 62 of the second movable rotor 60. The end rotary plate may be disposed on the connecting shaft of the second movable rotor 60 and thus be rotated together with the second movable rotor 60. Since the end rotary plate corresponds to the annular magnet of the second moving rotary plate so as to generate a magnetic field, the end rotary plate may be fixed to the body in addition to that the end rotary plate is disposed on the connecting shaft to be rotated as shown in the drawings.

In the above configuration, the shaft fixing rotor 30 and the first and second movable rotors 50 and 60 which are fixed to the rotating shaft 20 may be slidably mounted in the axial direction. For example, when an external pressure is applied to the shaft fixing rotor 30 in the axial direction, the shaft fixing rotor 30 may be axially moved to couple the rear end of the connecting shaft 32 of the shaft fixing rotor 30 to the coupling units 34 and 54 of the front end of the connecting shaft of the first movable rotor 50, thereby transmitting the rotational force of the shaft fixing rotor to the first movable rotor 50. Furthermore, when a stronger external pressure is applied to the shaft fixing rotor 30, the first movable rotor 50 may also be axially moved to couple the rear end of the connecting shaft 52 of the first movable rotor 50 to the coupling units 55 and 64 of the front end of the connecting shaft 62 of the second movable rotor 60, thereby transmitting a rotational force of the rotating shaft 20 up to the second movable rotor 60 to rotate the end rotary plate 70 coupled to the connecting shaft 62 of the second movable rotor 60.

Herein, the external pressure may be any pressure or a natural force such as a wind power or a tidal power. For example, when the generator of the present invention is installed on a wind power generator, an external pressure may be applied to the generator by the intensity of a wind pressure. That is, the rotating shaft 20 may be naturally pushed out by the wind pressure and then be sequentially coupled to the first and second movable rotors 50 and 60 to transmit a rotational force to the first and second movable rotors 50 and 60, or a wind power measurement sensor may be installed to the outside of the generator to pressurize the shaft fixing rotor 30 by a pneumatic power when a value measured by the sensor reaches a predetermined value, thereby sequentially transmitting a rotational force to the first and second movable rotors 50 and 60.

The repelling magnets 80 may be installed within the ends, which face with each other, of the connecting shafts 32, 52, and 62 of the shaft fixing rotor 30 and the first and second movable rotors 50 and 60. Thus, when an external pressure is not applied, the connecting shafts 32, 52, and 62 may be spaced apart from each other. That is, annular grooves 321, 521, and 621 may be defined in the ends of the connecting shafts of the rotors in an axial direction, respectively. Here, the repelling magnets 80 may be inserted into the grooves, and the coupling units may be disposed on the ends in which the grooves are not formed.

The repelling magnets disposed on the facing ends of the connecting shafts of the shaft fixing rotor 30 and the first and second movable rotors 50 and 60 may have the same polarity to generate magnetic repulsion, thereby pushing and spacing the rotors with respect to each other.

Therefore, when the intensity of the external pressure applied to the rotors is greater than the repelling force of the repelling magnets 80 disposed between the shaft fixing rotor 30 and the first and second rotors 50 and 60, the shaft fixing rotor and the first and second rotors 50 and 60 may overcome the repelling forces between the repelling magnets and thus be connected to each other. Here, the repelling force between the shaft fixing rotor and the first movable rotor may be less than that between the first movable rotor 50 and the second movable rotor 60. Thus, when the external pressure is applied to the rotors, the shaft fixing rotor 30 and the first movable rotor 50 may be firstly coupled to each other, and then the first movable rotor 50 and the second movable rotor 60 may be coupled to each other. That is, an order of the coupling may be determined by adjusting the intensity of the repulsion.

The coupling units 34, 54, 55, and 64 disposed on the ends of the connecting shafts 32, 52, and 62 of the shaft fixing rotor and the first and second movable rotors 50 and 60 may be detachable within a range in which the repelling magnet makes repulsion to push the coupling units against each other. As an example of the coupling unit, gear teeth may be formed on the end of the connecting shaft so as to transmit the rotational force according to whether the gear teeth are engaged with each other. The coupling units may transmit the rotational force to the rotor by using an internal gear or a planetary gear and may have various shapes to minimize the repulsion of the gear engagement due to the rotation.

Then, a stator 90 on which a coil is wound may be installed on the body 10 to generate a power due to electromagnetic induction caused by an action between the shaft fixing rotor 30 and the first and second movable rotors 50 and 60. That is, stators 90 may be disposed between the shaft fixing rotor 30 and the first movable rotor 50, between the first movable rotor 50 and the second movable rotor 60, and between the rotational part of the second movable rotor 60 and the end rotary plate 70 to generate an electromotive force due to an electromagnetic induction between the each of the rotors.

On the other hand, in the shaft fixing rotor 30 and the first and second movable rotors 50 and 60 that are movable rotors, each of the rotational parts may successively increase in diameter.

As shown in the drawing, the rotational part 31 of the shaft fixing rotor 30 that integrally rotate with the rotating shaft 20 may have the smallest diameter to minimize a weight of the generator. Hence, in the wind power generation, the rotors may rotate with a small power to generate a relatively low electromotive force, thereby generating power.

Also, the rotational part 51 of the first movable rotor 50 may have a diameter greater than that of the rotational part of the shaft fixing rotor 30 to generate an electromotive force greater than that generated when the shaft fixing rotor 30 independently rotates for transmitting the rotational force by coupling the two rotors to each other, thereby increasing the power generation. Also, the rotational part 61 of the second movable rotor 60 may have a diameter greater than that of the rotational part of the first movable rotor 50 to generate a greater electromotive force when the second movable rotor rotates 60.

The generator 1 as described above may be horizontally disposed on an upper portion of a tower 2, as shown in FIG. 4. The blade 3 may be coupled to the rotating shaft to rotate the rotating shaft when the blade 3 rotates by a wind pressure. Here, the blade may be designed so that the blade is pushed backward by wind pressure to push the rotating shaft 20 backward as much as a predetermined distance by wind pressure.

In the above structure, when a low wind pressure is generated, the rotational force of the blade may be transmitted to only the shaft fixing rotor 30 integrated with the rotating shaft 20 to generate an electromotive force between the shaft fixing rotor 30 and the first movable rotor 50, thereby generating electricity.

Also, when a wind pressure greater than the repelling force between the repelling magnets disposed on the shaft fixing rotor and the first movable rotor 50 is generated, the blade may be pushed toward a rear side of the shaft direction by the wind pressure to offset the repelling force between the two repelling magnets disposed on the shaft fixing rotor 30 and on the first movable rotor 50. Since the shaft fixing rotor 30 pushed backward is coupled (engaged with) to the coupling member of the end of the first movable rotor 50 and integrated with the first movable rotor 50, the rotational force of the shaft fixing rotor 30 may be transmitted to the first movable rotor 50 to generate an electromotive force from the two stators disposed between the shaft fixing rotor and the first movable rotor 50 and between the first movable rotor 50 and the second movable rotor 60, thereby generating power greater than that generated by the independent rotation of the shaft fixing rotor 30.

Also, when a wind pressure much greater than the wind pressure is generated, the blade may be further pushed toward the rear side of the shaft direction to press the shaft fixing rotor, thereby pushing the assembly of the shaft fixing rotor and the first movable rotor backward. The assembly of the shaft fixing rotor 30 and the first movable rotor 50 that are pushed backward may offset the repelling force between the two repelling magnets disposed between the first and second movable rotors 50 and 60 and then be integrated with the second movable rotor 60 to transmit the rotational force to the second movable rotor 60.

Due to the rotation of the second movable rotor 60, the end rotary plate 70 coupled to the second movable rotor 60 may rotate together, and an electromotive force may be generated from the three stators disposed between the shaft fixing rotor 30 and the first movable rotor 50, between the first movable rotor 50 and the second movable rotor 60, and between the second movable rotor 60 and the end rotary plate 70 so as to provide power generation greater than that generated in the above-described example.

Also, as shown in FIG. 5, the generator may be vertically disposed at various places and also may realize maximum power generation efficiency under the given environments by using other natural forces such as water power in addition to the wind power or by being applied to other systems to allow the number of rotors to vary according to the intensity of the applied rotational force (the natural force) so as to increase and decrease the power generation.

INDUSTRIAL APPLICABILITY

According to the present invention, a plurality of rotors are inserted into one rotating shaft, a plurality of rotors are detachably connected to each other, two rotors are spaced apart from each other by a repelling force between the magnets having the same polarity which are respectively disposed on the two rotors facing with each other, when an external pressure greater than or equal to the repelling force between the two magnets is applied to the rotors, the rotors are engaged with one another so as to transmit a rotational force to generate power, and the power generation varies in accordance with the intensity of the supplied rotational force. That is, the generator of the present invention may realize the power generation by a wide range of various acting pressures so as to improve the power generation efficiency.

While the present invention has been particularly shown and described with reference to exemplary embodiments thereof, it will be understood by those skilled in the art that various changes in form and details may be made therein without departing from the spirit and the scope of the present invention as defined by the appended claims.

What is claimed is:

1. A generator having variable power generation including a rotor disposed on a rotating shaft through which a rotational force is transmitted and a stator fixed to a body, the generator comprising:
   a generator body;
   a rotating shaft rotatably installed within the generator body to receive a rotational force, thereby rotating;
   a shaft fixing rotor including a disc-shaped rotational part disposed on the rotating shaft and in which an annular magnet is installed, and a tube-shaped connecting shaft disposed on a center of the rotational part and having an end on which a coupling means detachable by sliding is disposed;
   a plurality of movable rotors slidably disposed on the rotating shaft, including disc-shaped rotational parts in which annular magnets are installed, and tube-shaped connecting shafts disposed on the center of the rotational part and having an end on which coupling means detachable by sliding are disposed, wherein a plurality of movable rotors are axially installed on the shaft fixing rotor successively by an external pressure to receive the rotational force;
   repelling magnets installed within ends of the connecting shaft of the shaft fixing rotor and the connecting shaft of the movable rotor, respectively, the repelling magnets having facing surfaces with the same polarity to space the shaft fixing rotor apart from a plurality of movable rotors by a magnetic repelling force therebetween; and
   a stator, which is a wound coil, fixed to the body so that the stator is disposed between the shaft fixing rotor and a plurality of movable rotors.

2. The generator of claim 1, wherein coupling units disposed on one end or both ends of the connecting shafts are constituted by gears so that corresponding ends of coupling units are engaged with each other.

3. The generator of claim 1, wherein the movable rotor is constituted by a first movable rotor coupled to the shaft fixing rotor and a second movable rotor coupled to the first movable rotor,
   wherein respective rotors have diameters gradually increasing in an order of the shaft fixing rotor<the first movable rotor<the second movable rotor, and
   wherein the first and second movable rotors are pressed so that the first and second movable rotors are successively coupled to the shaft fixing rotor in accordance with intensity of the rotational force supplied to the rotor so as to increase the power generation.

4. The generator of claim 3, wherein an end rotary plate having the same diameter as that of the second movable rotor is disposed on the connecting shaft of the second movable rotor to space a predetermined distance from the second movable rotor, and the stator fixed to the body is disposed between the end rotary plate and the second movable rotor.

5. The generator of claim 3, wherein the rotational part of the shaft fixing rotor that integrally rotate with the rotating shaft have the smallest diameter to minimize a weight of the generator, wherein in the wind power generation, the rotors rotate with a small power to generate a relatively low electromotive force, thereby generating power,
   wherein the rotational part of the first movable rotor has a diameter greater than that of the rotational part of the shaft fixing rotor to generate an electromotive force greater than that generated when the shaft fixing rotor independently rotate for transmitting the rotational force by coupling the two rotors to each other, thereby increasing the power generation, and
   wherein the rotational part of the second movable rotor has a diameter greater than that of the rotational part of the first movable rotor to generate a greater electromotive force when the second movable rotor rotates.

6. The generator of claim 1, wherein a plurality of rotors are inserted into one rotating shaft, the plurality of rotors are detachably connected to each other, two rotors are spaced apart from each other by a repelling force between magnets having the same polarity which are respectively disposed on the two rotors facing each other, when an external pressure greater than or equal to the repelling force between the two magnets is applied, the rotors are engaged with one another to transmit a rotational force so as to generate power, and the amount of power generation varies in accordance with the intensity of the supplied rotational force.

* * * * *